United States Patent
Kinashi

(10) Patent No.: US 7,408,281 B2
(45) Date of Patent: Aug. 5, 2008

(54) STATOR AND BRUSHLESS MOTOR

(75) Inventor: Yoshikazu Kinashi, Hyogo (JP)

(73) Assignee: Ichinomiya Denki Co., Ltd., Sisou-shi (JP)

( * ) Notice: Subject to any disclaimer, the term of this patent is extended or adjusted under 35 U.S.C. 154(b) by 15 days.

(21) Appl. No.: 11/178,402

(22) Filed: Jul. 12, 2005

(65) Prior Publication Data

US 2006/0022544 A1 Feb. 2, 2006

(30) Foreign Application Priority Data

Jul. 30, 2004 (JP) .......................... P2004-224300

(51) Int. Cl.
*H02K 3/28* (2006.01)
*H02K 3/18* (2006.01)

(52) U.S. Cl. ...................... 310/184; 310/180

(58) Field of Classification Search ................. 310/179, 310/180, 184

See application file for complete search history.

(56) References Cited

U.S. PATENT DOCUMENTS

| | | | | |
|---|---|---|---|---|
| 2,575,716 | A * | 11/1951 | Kilgore | 318/771 |
| 4,774,428 | A * | 9/1988 | Konecny | 310/198 |
| 6,281,609 | B1 * | 8/2001 | Itami et al. | 310/68 B |
| 6,417,592 | B2 * | 7/2002 | Nakamura et al. | 310/184 |
| 6,998,750 | B2 * | 2/2006 | Anma et al. | 310/198 |
| 2004/0041489 | A1 * | 3/2004 | Horst et al. | 310/181 |

FOREIGN PATENT DOCUMENTS

| | | |
|---|---|---|
| EP | 1344296 | 9/2003 |
| JP | 53057889 A * | 5/1978 |
| JP | 59-067858 * | 4/1984 |
| JP | 4308435 * | 10/1992 |
| JP | 09-191588 | 7/1997 |
| JP | 10-271770 | 10/1998 |
| JP | 2001-145281 | 5/2001 |
| JP | 2001-169490 | 6/2001 |
| JP | 2001-309625 | 11/2001 |
| JP | 2002-058181 | 2/2002 |
| JP | 2002-199638 | 7/2002 |
| WO | WO-02052693 | 7/2002 |

OTHER PUBLICATIONS

"Three-Phase Measurements" Voltech Notes, 2003. http://www.voltech.com/support/articles/51/Three%20Phase%20Measurements%20(104-022).pdf.*

* cited by examiner

*Primary Examiner*—Burton Mullins
(74) *Attorney, Agent, or Firm*—Edwards Angell Palmer & Dodge LLP

(57) ABSTRACT

A technique of facilitating a coil winding work by continuously winding coils in the same direction, in a stator in which a plurality of coils constituting a coil group of the same phase are respectively arranged so as to include positions at which phases of induction voltage are different, whereby coil groups of three phases are disposed in a ring shape. A stator (102) of the invention has a structure in that a pair of coils (21U1, 21U4) and coils (21U2, 21U3) in which phases of induction voltage are identical in a plurality of coils (21U1 to 21U4) constituting a U-phase coil group (21U) are set as different divided groups, the respective coils (21U1, 21U4) and coils (21U2, 21U3) in the divided group are continuously wound in the same winding direction while arranging crossovers (26U1, 26U3) respectively between the coils (21U1, 21U4) and between the coils (21U2, 21U3), the divided groups are connected in parallel, and a V phase and a W phase are executed in the same manner, whereby lead wires of three-phase coil groups (21U, 21V, 21W) are star connected.

11 Claims, 16 Drawing Sheets

21W COIL GROUP
21W1~21W4 COIL
26W1~26W3 CROSSOVER

100 BRUSHLESS MOTOR
102 STATOR

21V COIL GROUP
21V1~21V4 COIL
26V1~26V3 CROSSOVER

21W  COIL GROUP
21W1~21W4  COIL
26W1~26W3  CROSSOVER

STATOR AND BRUSHLESS MOTOR

BACKGROUND OF THE INVENTION

1. Field of the Invention

The invention relates to a three-phase coil stator in which a plurality of coils are arranged in a ring shape. More particularly, the invention relates to a stator suitable for a stator of a brushless motor.

2. Description of the Related Art

Various motors such as an induction motor and a commutator motor have been conventionally used as the motor. However, in recent years, a brushless motor which has high performance has been frequently used. For example, an inner rotor type brushless motor has a structure such that a stator around which a plurality of coils are wound is formed as an outer stator and a rotor having a magnet arranged in an outer periphery is formed as an inner rotor. The stator is produced by applying a coil winding to a stator core in which a teeth portion for winding the coil is protruded to an inner side in a ring shape. However, because a leading end side becomes narrow between the adjacent teeth portions, the act of coil winding tends to be complicated, and it is not easy to improve a space factor or the coil winding. In order to solve such a problem, there has been invented a stator core in which the stator core can be divided at every tooth portion, and each of the tooth portions can be formed in a linear shape at the time of a coil winding work.

For example, JP-A 2002-58181 discloses a stator in which divided core units are structured by forming a crossover between a plurality of divided cores obtained by dividing a stator core into tooth portion units continuously wound, and the divided core units are coupled in a ring shape in such a manner as to form a rotating magnetic field by three phases of a U phase, a V phase and a W phase. According to this configuration, it is possible to continuously wind by appropriately attaching the divided cores to a jig or the like so as to obtain a layout by which a coil winding work can be easily executed, and it is possible to thereafter couple the divided core units in the ring shape. Therefore, it is possible to make the coil winding work easy and it is possible to improve a space factor of the coil winding.

Further, JP-A 10-271770 (1998) discloses a configuration in that coils are continuously wound every phase by forming a crossover between a plurality of core segments divided per a teeth portion unit, a core segment serial body is formed by coupling concave grooves and convex pieces of the core segments, and a stator is thereafter formed by rounding in an annular body. Also in such a configuration, similarly to the above configuration, it is possible to facilitate the coil winding work and improve the space factor of the coil winding.

Further, JP-A 9-191588 (1997) discloses a configuration such that a stator having a ring shape is formed by continuously winding the coil around a linear unit core configured by integrally coupling a thin coupling portion every teeth portions by connecting between the coils by a crossover, and bending the thin coupling portion after finishing the coil winding. Also in such a configuration, similarly to the above configuration, it is possible to facilitate the coil winding work and improve the space factor of the coil winding.

For the most part, the coil of the stator as described above is continuously wound every phase, and the rotating magnetic field is formed by a coil group of three phases of the U phase, the V phase and the W phase. Accordingly, the number of teeth, that is, the number of slots of the stator is set to an integral multiple of three such as 3, 6, 9 and 12. The slot number of the stator is set in accordance with a design concept of the motor. However, the number of poles of the motor, that is, the number of poles of the magnet in the rotor is important in view of the design of the motor, and the number of poles of the magnet is determined while taking a normal rotation speed and a maximum rotation speed of the motor, and a magnitude of the motor into consideration, and the optimum number of slots of the stator is selected in correspondence to the number of poles of the magnet.

As described above, the number of poles of the magnet and the number of slots are determined on the basis of the design concept. However a description will be given here by exemplifying a brushless motor in which the number of poles of the magnet is 8 or 14, and the number of slots of the stator is 12. In this case, a cogging torque is lowered by setting the number of poles of the magnet to 14 in comparison with the case of 8 poles, and there is an advantage in that a large amount of torque can be obtained at a low rotation speed range such as about 1000 RPM.

FIG. 11 shows a configuration of a brushless motor 900 having 8 poles and 12 slots, and FIG. 12 is a schematic view showing a coil polarity thereof. Magnets 91 disposed in a periphery of a rotor 90 are arranged in 8 poles at a uniform interval in a circumferential direction such that N poles and S poles are alternately formed. On the contrary, 12 coils 93a to 93l of a stator 92 are arranged at a uniform interval in a circumferential direction so as to surround the rotor 90. In the brushless motor 900 having 8 poles and 12 slots as described above, as shown in FIG. 11, the coils 93a, 93d, 93g and 93j are arranged so as to form the U phase, the coils 93b, 93e, 93h and 93k are arranged so as to form the V phase, and the coils 93c, 93f, 93i and 93l are arranged so as to form the W phase. This arrangement is assumed to have the best motor efficiency in the brushless motor 900 having 8 poles and 12 slots. Accordingly, for example, on the assumption that the stator 92 is constituted by 12 divided cores, the U-phase coils 93a, 93d, 93g and 93j are continuously wound around four divided cores by forming a crossover between the respective divided cores, and the V-phase coils 93b, 93e, 93h and 93k and the W-phase coils 93c, 93f, 93i and 93l are continuously wound around respective four divided cores while forming crossovers between the divided cores in the same manner, whereby the respective divided cores are coupled in a ring shape on the basis of an arrangement shown in FIG. 11. In this case, in FIG. 11, a circular mark in each of the coils 93a to 93l denotes a winding start of the coil winding, and a square mark denotes a winding end of the coil winding. Winding directions of the coils continuously wound respectively in the U phase, the V phase and the W phase are the same direction. Further, it is preferable that a wire connection of each of the coils 93a to 93l is constituted by a star wire connection in which four coils in each of the phases are connected in series as shown in FIG. 13. Further, for example, the respective coils 93a, 93d, 93g and 93j of the U phase are in conformity to each other in a phase and a magnitude of induction voltage as shown in FIG. 12, and a circulating current does not flow even by connecting wires in parallel. Therefore, it is possible to form a two-star wire connection of two parallels or a four-star wire connection of four parallels, by appropriately cutting the crossover between the respective phase coils.

On the other hand, FIG. 14 shows a configuration of a brushless motor 901 having fourteen poles and twelve slots, and FIG. 15 is a schematic view showing a coil polarity thereof. Magnets 96 disposed in a periphery of a rotor 95 are arranged in 14 poles at a uniform interval in a circumferential direction such that N poles and S poles are alternately formed. On the contrary, a stator 97 has a structure such that 12 coils 98a to 98l are arranged at a uniform interval in a circumferential direction so as to surround the rotor 95 as in the stator 92. However, a coil polarity is different from the stator 92. In detail, as shown in FIG. 14, the coils 98a, 98b, 98g and 98h are arranged so as to form the U phase in which the coils 98a and 98h and the coils 98b and 98g form unlike poles, the coils 98c, 98d, 98i and 98j are arranged so as to form the V phase in which the coils 98c and 98j and the coils 98d and 98i form unlike poles, and the coils 98e, 98f, 98k and 98l are arranged so as to form the W phase in which the coils 98e and 98l and the coils 98f and 98k form unlike poles. This arrangement is assumed to have the best motor efficiency in the brushless motor 901 having 14 poles and 12 slots. In this case, the unlike poles are expressed by with or without a mark "-" on the U, V and W phases in the figure. In the stator 97, in the respective coils 98a, 98b, 98g and 98h in the U phase, for example, the coils 98a and the coil 98b are not in conformity in the phase and the magnitude of the induction voltage but are shifted at 30 degrees, as shown in FIG. 15. Accordingly, if the coils 98a and the coil 98b are connected in parallel, the circulating current flows and the performance of the brushless motor 901 is lowered. Accordingly, as shown in FIG. 16, the coil 98a and the coil 98b, and the coil 98g and the coil 98h are connected in series, respectively. Because the coils 98a and 98b and the coils 98g and 98h connected in series are in conformity in the phase and the magnitude of the induction voltage, the coils are connected in parallel. Further, the other V phase and W phase are connected in the same manner, and the two-star wire connection as shown in the figure is formed.

In the case where the stator 97 is constituted, for example, by 12 divided cores, the continuous coil winding is executed by forming the crossover between two divided cores while changing the winding direction so as to wind the U-phase coils 98a and 98b connected in series in a clockwise direction around one divided core and to wind them in a counterclockwise direction around the other divided core, the continuous coil winding is executed by forming the crossover between two divided cores while changing the winding direction so as to wind the U-phase coils 98g and 98h connected in series in a clockwise direction around one divided core and to wind them in a counterclockwise direction around the other divided core, and the continuous coil winding is executed by forming the crossover in such a manner that the winding direction is inverted every two divided cores in the same manner as the U-phase, with regard to the V-phase coils 98c, 98d, 98i and 98j, and the W-phase coils 98e, 98f, 98k and 98l, as shown in FIG. 14. Accordingly, the divided cores 99a to 99l are coupled in the ring shape, and neutral points in the respective phases are connected. In this case, a circular mark in each of the coils 98a to 98l denotes a winding start of the coil winding, and a square mark denotes a winding end of the coil winding in FIG. 14.

In the stator 97, a so-called flyer-type or nozzle-type coil winding machine is employed for a coil winding work around the divided core or the like. However, taking into consideration a property of the coil winding machine and a simplification of the coil winding work such as a process of the crossover or the like, it is preferable that the continuous coil winding is executed in the same winding direction. Further, taking into consideration an assembling work of the stator 97 and the simplification of the coil winding work, it is preferable to continuously wind the divided cores or the like as many as possible. However, as exemplified by the brushless motor 901 having 14 poles and 12 slots, if coils of the same phase have the arrangement in which the phase and the magnitude of the induction voltage are different, the coils capable of being connected in parallel are limited. Further, if the coils connected in series have unlike poles, the winding direction of the continuously wound coils is inverted. In such a stator, it is impossible to continuously wind all the divided core or the like of the same phase, and it is impossible to make the winding directions of the continuously wound coils identical.

Further, it is necessary to execute the process of the crossover after forming the crossover between the coils so as to continuously wind around the divided cores or the like, and assembling the divided cores or the like as the stator. Herein, as shown in the stator 97, the crossover between the adjacently arranged coils such as the continuously wound coils 98a and 98b, protrudes in an axial direction of the stator 97 from the coils 98a and 98b, and the size of the brushless motor 901 is enlarged at the space corresponding to the protruding amount of the crossover. However, the layout of the divided cores or the like at a time of assembling is deteriorated and the assembling work is difficult to be executed in the case that the length of the crossover is shortened; therefore, it is impossible to make the crossover too short. Further, the thick coil wire is used in the motor having a high torque; therefore, the crossover becomes thick, and a great force is required for forming the crossover bent in the U shape at the adjacent positions such as the coils 98a and 98b so as to appropriately receive the crossover for space saving, so that it is hard to work by a human power.

SUMMARY OF THE INVENTION

The invention has been achieved in view of the above points, and an object of the invention is to provide a technique of facilitating a coil winding work by continuously winding coils in the same direction, in a stator in which a plurality of coils constituting a coil group of the same phase are respectively arranged so as to include positions at which phases of induction voltage are different, whereby coil groups of three phases are disposed in a ring shape.

Another object of the invention is to enable to continuously wind the coils of the same phase in the same direction in the stator.

Still another object of the invention is to facilitate a process of a crossover between the continuously wound coils, in the case that coil groups of the same phase are arranged in unlike poles adjacently.

The invention provides a stator in which a plurality of coils constituting a coil group of the same phase are respectively arranged so as to include positions at which phases of induction voltage are different, whereby coil groups of three phases are disposed in a ring shape, wherein a pair of coils of the same phase of induction voltage are set as an independent divided group in a plurality of coils constituting the coil group of the same phase, the respective coils in the divided group are continuously wound in the same winding direction with a crossover provided between the respective coils, the divided groups are connected to each other in parallel, and lead wires in coil groups of the three phases are star connected.

In the invention, the respective coils in the coil group of the same phase are continuously wound in the same winding direction with the crossover provided between the respective coils, and the crossover between the coils constituting the other divided group in the crossover is formed as a neutral point of the star wire connection.

In the invention, the coil group of the same phase includes the coils which are arranged adjacently so as to have unlike poles, and the adjacent coils are formed as the other divided group.

In the invention, the coils constituting one divided group in the coil group of the same phase are arranged at a position in which at least one coil in the coil group of the different phase is interposed.

In the invention, the number of the coils constituting the coil group of the same phase is an even number equal to or more than four.

The invention also provides a brushless motor, wherein a stator is constituted by the above-mentioned stator.

According to the invention, a pair of coils of the same phase of induction voltage are set as the independent divided group in a plurality of coils constituting the coil group of the same phase, the respective coils in the divided group are continuously wound in the same winding direction with the crossover provided between the respective coils, the divided groups are connected to each other in parallel, and the lead wires in the coil groups of three phases are star connected. Therefore, it is possible to facilitate a coil winding work by continuously winding coils in the same direction, in a stator in which a plurality of coils constituting a coil group of the same phase are respectively arranged so as to include positions at which phases of induction voltage are different, whereby coil groups of three phases are disposed in a ring shape.

According to the invention, the respective coils in the coil group of the same phase are continuously wound in the same winding direction with the crossover provided between the respective coils, and the crossover between the coils constituting the other divided group in the crossover is formed as a neutral point of the star wire connection. Therefore, it is possible to continuously wire all the respective coils of the same phase in the same direction, and the coil winding work becomes further easy.

According to the invention, the coil group of the same phase includes the coils which are arranged adjacently so as to have unlike poles, and the adjacent coils are formed as the other divided group. Therefore, the crossover is not formed between the adjacent coils and the process of the crossover in the stator is easily executed.

According to the invention, the coils constituting one divided group in the coil group of the same phase are arranged at a position in which at least one coil in the coil group of the different phase is interposed. Therefore, the crossover is not formed between the adjacent coils in the same manner as mentioned above, the process of the crossover in the stator is easily executed, it is possible to form and process the crossover without crossing, and a reliability of the motor is improved.

The effects of the invention mentioned above is significant in the case that the number of the coils constituting the coil group of the same phase is an even number equal to or more than four, and the same effect can be obtained by a brushless motor wherein a stator is constituted by the above-mentioned stator.

BRIEF DESCRIPTION OF THE DRAWINGS

FIG. 2 is a plan view showing a configuration of a divided core 20a;

DESCRIPTION OF THE PREFERRED EMBODIMENT

Description will be given below of an embodiment according to the invention with reference to the accompanying drawings in detail.

Figure 1:
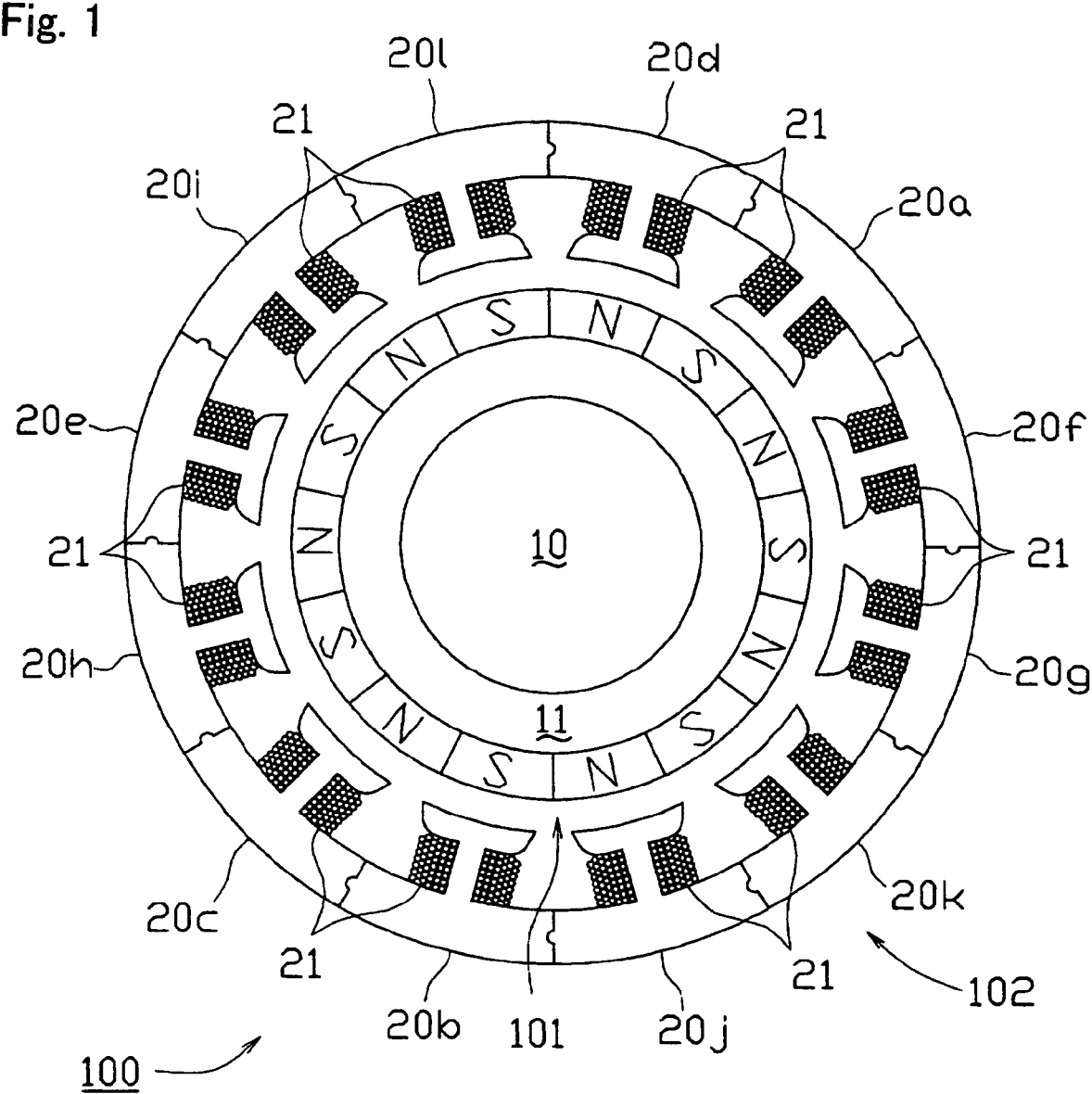
FIG. 1 is a horizontal cross sectional view showing a configuration of a brushless motor 100 according to an embodiment of the invention.

A brushless motor 100 according to an embodiment of the invention is of an inner rotor type constituted by an inner rotor and an outer stator. As shown in FIG. 1, the inner rotor is constituted by a rotor 101, and the outer stator is constituted by a stator 102 in which 12 divided cores 20a to 20l (not shown) divided every tooth are coupled in an annular shape, and coils 21 are wound around the respective teeth. The rotor 101 is rotatably disposed within the stator 102 with a fixed gap. In this case, the stator and the brushless motor according to the invention are not particularly limited in the number of motor poles and the number of slots, and can be carried out in a stator in which a plurality of coils constituting a coil group of the same phase are respectively arranged so as to include positions at which phases of induction voltage are different, whereby coil groups of three phases are disposed in a ring shape. However, in this embodiment, description will be given of a brushless motor having 14 poles and 12 slots.

The rotor 101 includes a shaft 10 forming a shaft of the motor, a rotor yoke 11 provided concentrically with the shaft 10, and a magnet 12 provided in an outer periphery of the rotor yoke 11, as shown in the figure.

The rotor yoke 11 is integrally formed by laminating steel plates punched in a disc shape according to a caulking or the like. A through hole is formed in a center of the rotor yoke, the shaft 10 is inserted to the center and fixed thereto according to a shrink fitting or the like. The magnet 12 is fixed to an outer periphery of the rotor yoke 11. The magnet 12 is constituted by a permanent magnet in which magnet particles are sintered in a cylindrical shape as shown in the figure, and 14 magnetic poles are formed in a circumferential direction such that N poles and S poles are alternately arranged. In this case, in place of a so-called ring magnet which is sintered in a cylindrical shape, the magnet 12 can employ the other well-known stator magnets such as magnets divided in every magnetic poles and the like. Further, although not shown in the figure, a disc-like protection plate may be provided in both end surfaces in an axial direction of the magnet 12, and a cylindrical protection member may be provided so as to cover an outer peripheral surface of the magnet 12. Because the end surface and the outer peripheral surface of the magnet 12 are covered with the protection plate and the protection member, it is possible to prevent small pieces of the magnet from being scattered, and it is possible to prevent the magnet 12 from being rusted.

Figure 2:
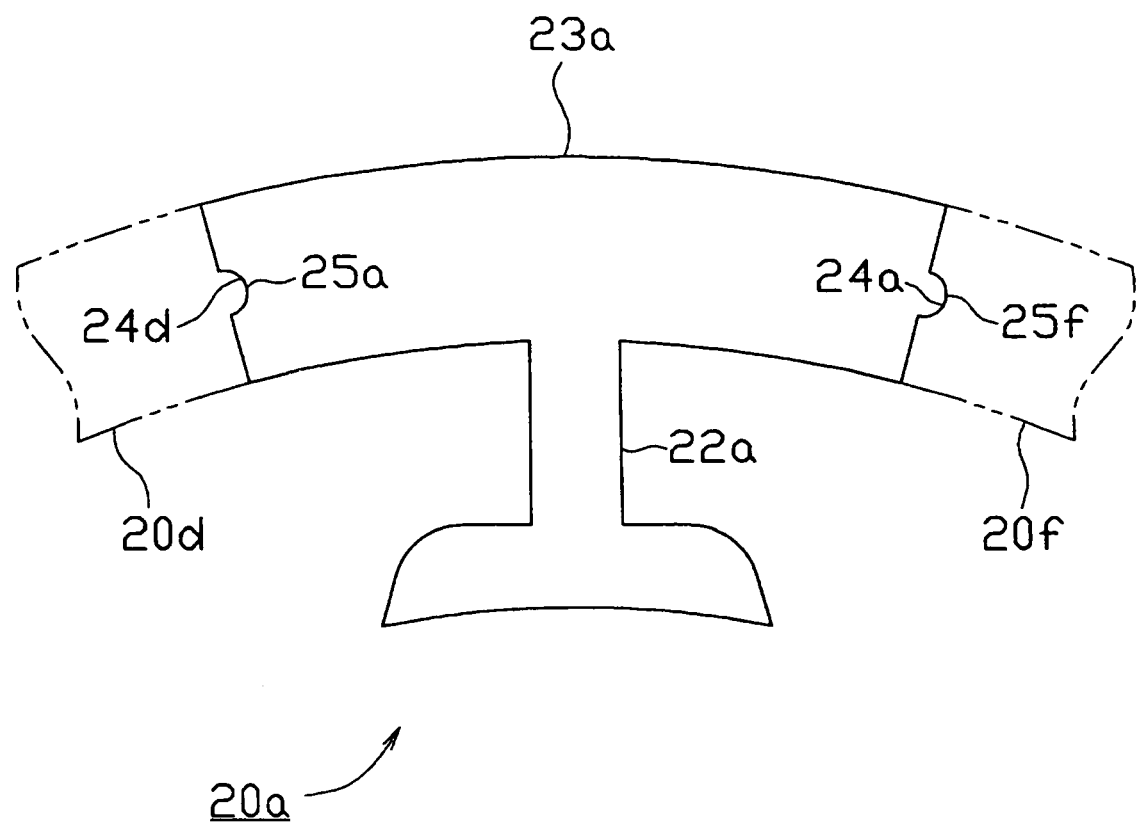

Because 12 divided cores 20a and 20l constituting the stator 102 are annularly coupled and have the same shape while being different in arrangement, description will be given of a structure of each of the divided cores 20a to 20l by exemplifying the divided core 20a. As shown in FIG. 2, the divided core 20a is formed in an approximately T shape such that a tooth 22a around which the coil 21 is wound so as to form a magnetic pole protrudes from a core yoke 23a annularly coupled to the other divided core, and has a structure such that the laminated steel plate having the same shape as illustrated are firmly fixed according to a bonding, a caulking, a welding or the like. The core yoke 23a is formed in a circular arc shape which corresponds to about one twelfth with respect to the annular stator 102, a convex portion 24a and a concave portion 25a are respectively formed in both sides thereof, the convex portion 24a and the concave portion 25a are respectively fitted to a convex portion 24d or a concave portion 25f of the other adjacent divided core, and 14 divided cores 20a to 20l are annularly coupled. Further, a tooth 21a protrudes toward an axis of the stator 102 from the core yoke 22a, a peripheral side surface thereof is covered in an insulative manner with a bobbin made of insulating paper or insulative synthetic resin, and the coil 21 is wound therearound.

The coil 21 is wound around each of the divided cores 20a to 20l by using a flyer-type or nozzle-type coil winding machine; however, the coil 21 is continuously wound every phase of the U phase, the V phase and the W phase such that the coils of the same phase are formed as one group. In other words, the coils 21U1, 21U2, 21U3 and 21U4 constituting the U phase are continuously wound around the divided cores 20a, 20b, 20c and 20d, the coils 2lV1, 21V2, 21V3 and 21V4 constituting the V phase are continuously wound around the divided cores 20e, 20f, 20g and 20h, and the coils 21W1, 21W2, 21W3 and 21W4 constituting the W phase are continuously wound around the divided cores 20i, 20j, 20k and 20l. Hereinafter, the respective coil groups of the same phases are referred to as the coil groups 21U, 21V and 21W.

Figure 3:
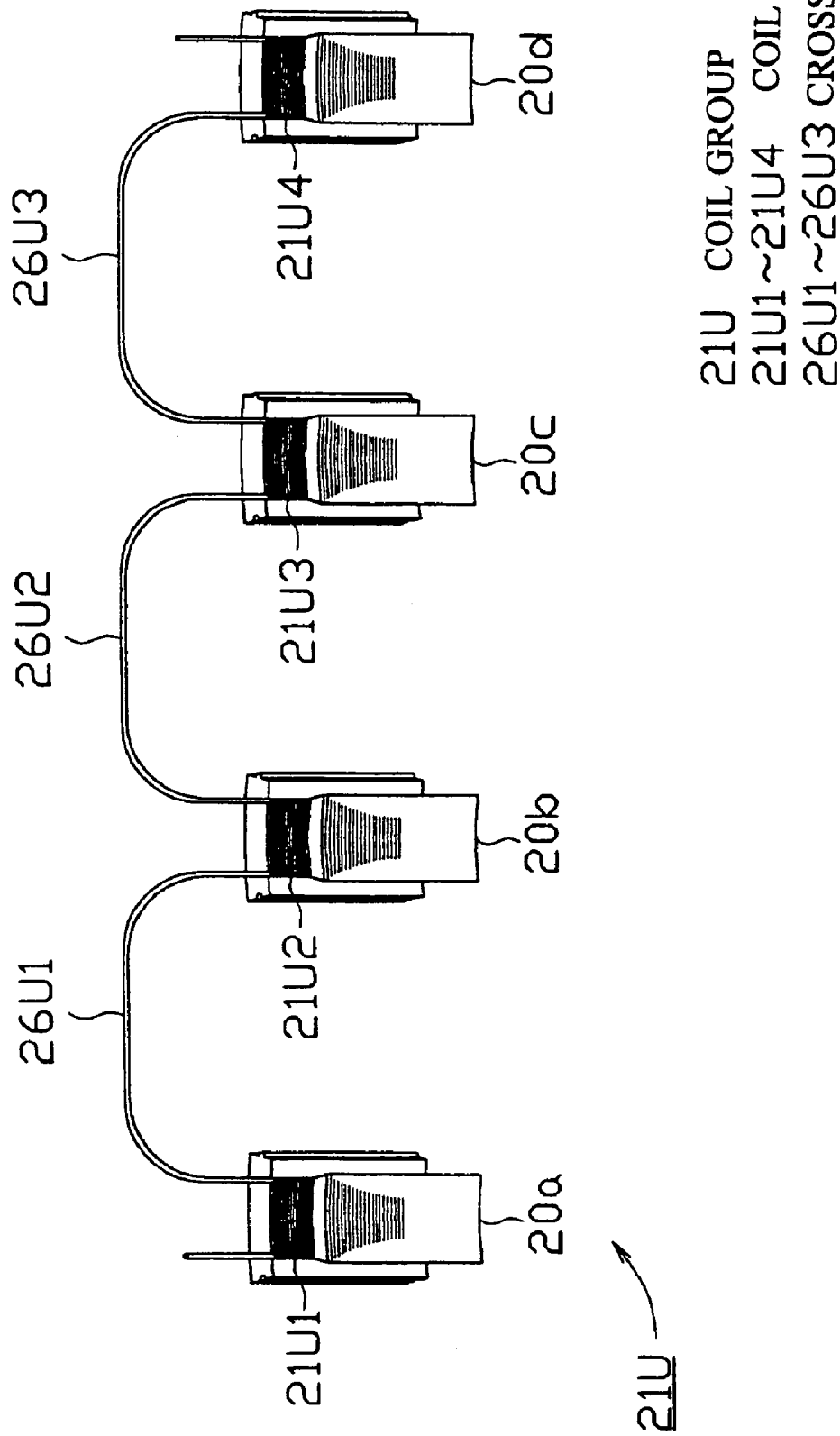
FIG. 3 is a perspective view showing a configuration of a coil group 21U.

FIG. 3 shows the coil group 21U. The coil 21U1 is first wound in a counterclockwise direction around the tooth 22a of the divided core 20a, a crossover 26U1 having a predetermined length is further provided, the coil 21U2 is wound in a counterclockwise direction around the tooth 22b of the next divided core 20b, a crossover 26U2 having a predetermined length is provided in the same manner, the coil 21U3 is wound in a counterclockwise direction around the teeth tooth 22c of the third divided core 20c, a crossover 26U3 having a predetermined length is provided in the same manner, and the coil 21U4 is wound in a counterclockwise direction around the tooth 22d of the last divided core 20d. As described above, an efficiency of the coil winding work is improved and a space factor of the coil is improved by continuously winding the coils 21U1, 21U2, 21U3 and 21U4 constituting the same phase in the same coil winding direction. The coil groups 21V and 21W are not illustrated. However, in the coil group 21V, the coils 21V1, 21V2, 21V3 and 21V4 are continuously wound in a counterclockwise direction around four divided cores 20e, 20f, 20g and 20h while being provided with crossovers 26V1, 26V2 and 26V3, in the same manner as the coil group 21U. In the coil group 21W, the coils 21W1, 21W2, 21W3 and 21W4 are continuously wound in a counterclockwise direction around four divided cores 20i, 20j, 20k and 20l while being provided with crossovers 26V1, 26V2 and 26V3, in the same manner as the coil group 21U.

Figure 4:
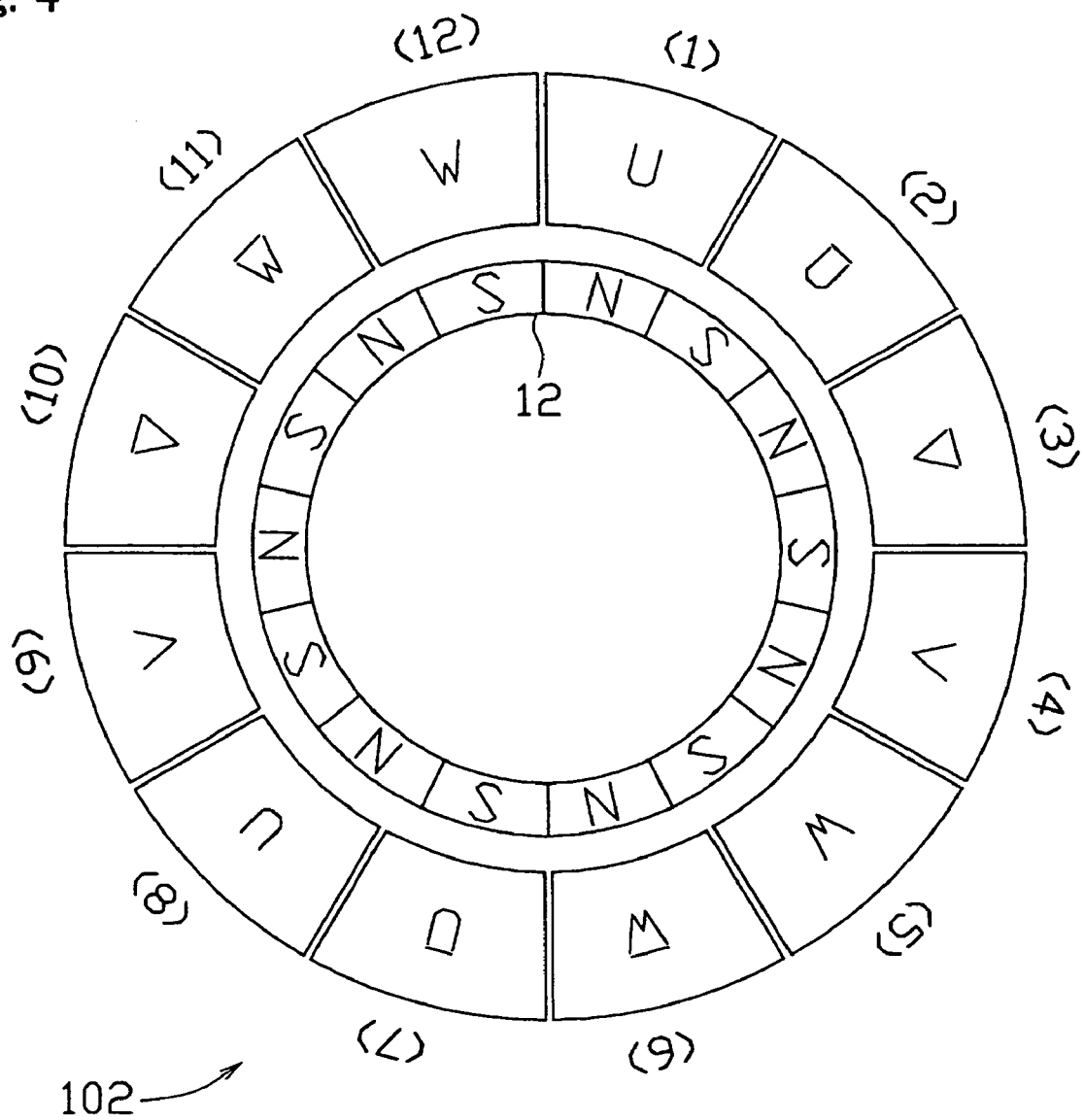
FIG. 4 is a schematic view showing arrangements of a U phase, a V phase and a W phase in the brushless motor 100.

The respective coil groups 21U, 21V and 21W are provided in a ring shape according to a predetermined arrangement and the respective adjacent divided cores 20a to 20l are fixed to each other according to a welding or the like so as to form the stator 102. FIG. 4 is a view for explaining the arrangement of the respective coil groups 21U, 21V and 21W. As shown in the figure, in the stator 102 of the brushless motor 100 having 14 poles and 12 slots, (1) U phase, (2) U phase (unlike pole), (3) V phase (unlike pole), (4) V phase, (5) W phase, (6) W phase (unlike pole), (7) U phase (unlike pole), (8) U phase, (9) V phase, (10) V phase (unlike pole), (11) W phase (different phase) and (12) W phase are arranged in a clockwise direction from an upper side in the figure, and this arrangement is assumed to have a best motor efficiency. In this case, in the figure, the unlike poles are denoted by a mark "-" on the symbols U, V and W.

Figure 5:
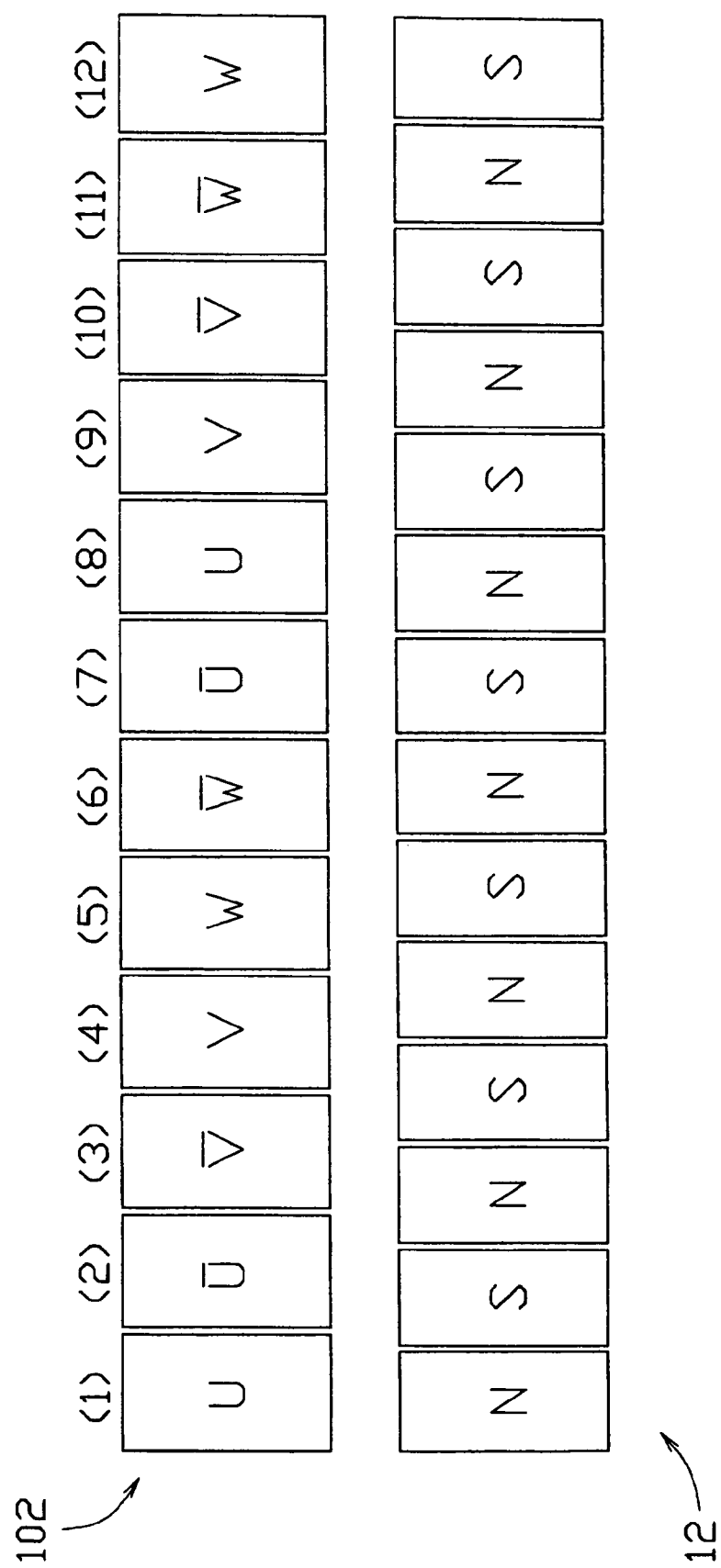
FIG. 5 is a schematic view showing phases of the U phase, the V phase and the W phase in the brushless motor 100.

In such an arrangement, as shown in FIG. 5, positions in which phases of induction voltage are shifted are included in four coils constituting each of the coil groups 21U, 21V and 21W of the same phase. For example, each of the coils 21U1, 21U2, 21U3 and 21U4 of the U-phase coil group 21U is arranged at any of the positions (1), (2), (7) and (8) in the figure. However, the phase is 30 degrees different between the position (1) and the position (2). Further, the coils are arranged between the adjacent positions (1) and (2) and between the positions (7) and (8) so as to have unlike poles. On the other hand, because the magnet poles of the magnet 12 have unlike poles in the positions (1) and (7) and the positions (2) and (8) which are arranged at the positions interposing the coil groups 21V and 21W having the different phases while the positions have the unlike poles, the phases are the same. Accordingly, the phases of two coils connected in series are the same by connecting the respective coils arranged at the positions (1) and (8) in series and connecting the respective coils arranged at the positions (2) and (7) in series; therefore, no circulating current flows even if two coils connected in series are further connected in parallel. Further, the polarities of the coils are the same at the positions (1) and (8) connected in series, and the same manner is applied at the positions (2) and (7).

Figure 6:
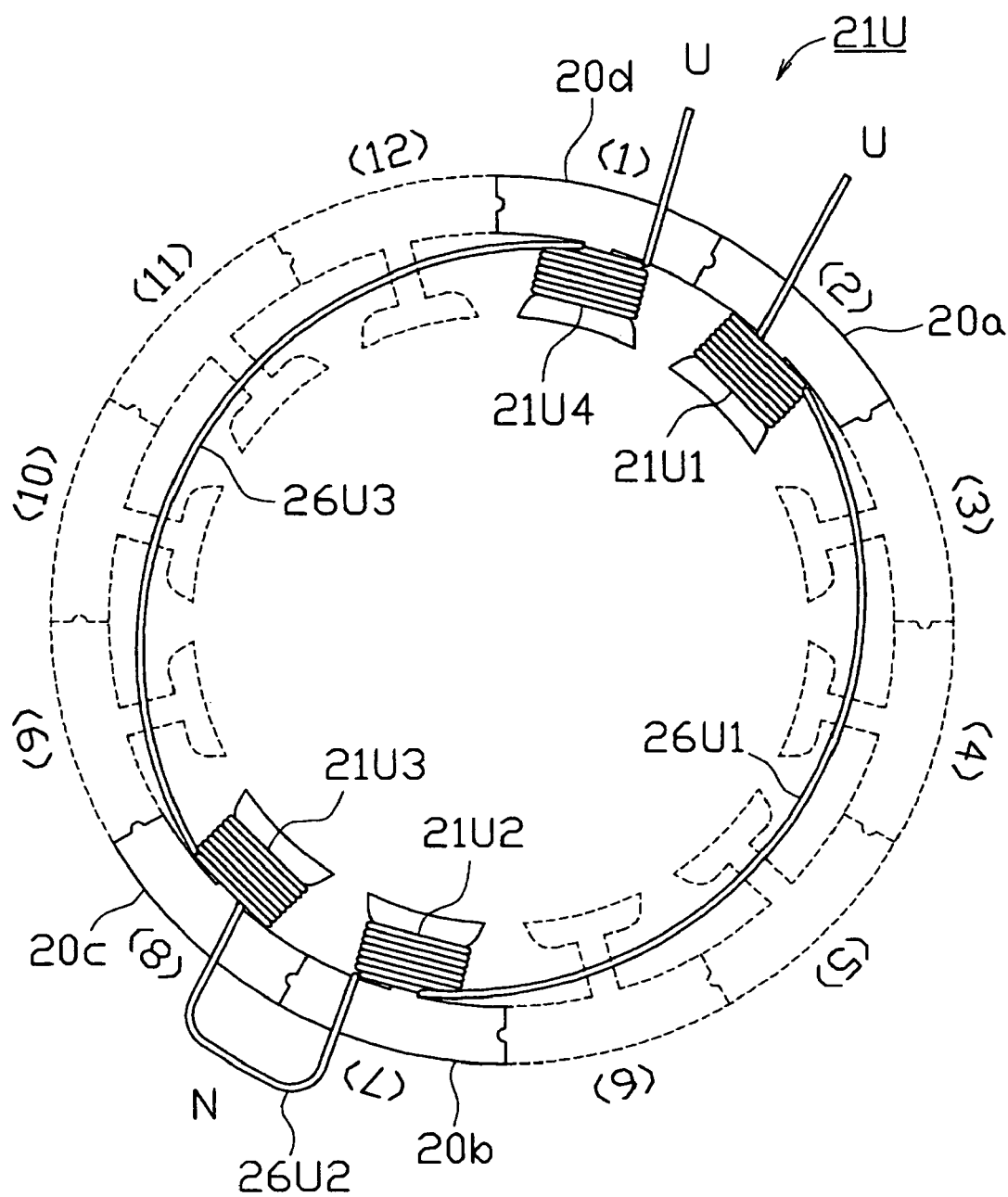
FIG. 6 is a schematic view showing an arrangement of the coil group 21U.

Accordingly, the coils 21U1 and 21U2 and the coils 21U3 and 21U4 are formed as the different divided groups connected in parallel, among the respective coils 21U1, 21U2, 21U3 and 21U4 of the U-phase coil group 21U shown in FIG. 3, and are arranged such that the crossover 26U2 between the coil 21U2 and the coil 21U3 constituting the different divided groups becomes a neutral point N of the star wire connection. In other words, as shown in FIG. 6, the coil 21U1 is arranged at the position (2), the coil 21U2 is arranged at the position (7), the coil 21U3 is arranged at the position (8), the coil 21U4 is arranged at the position (1), the lead wires from the coils 21U1 and 21U4 are set as an input of the U phase, and the crossover 26U2 is set as the neutral point N.

Figure 7:
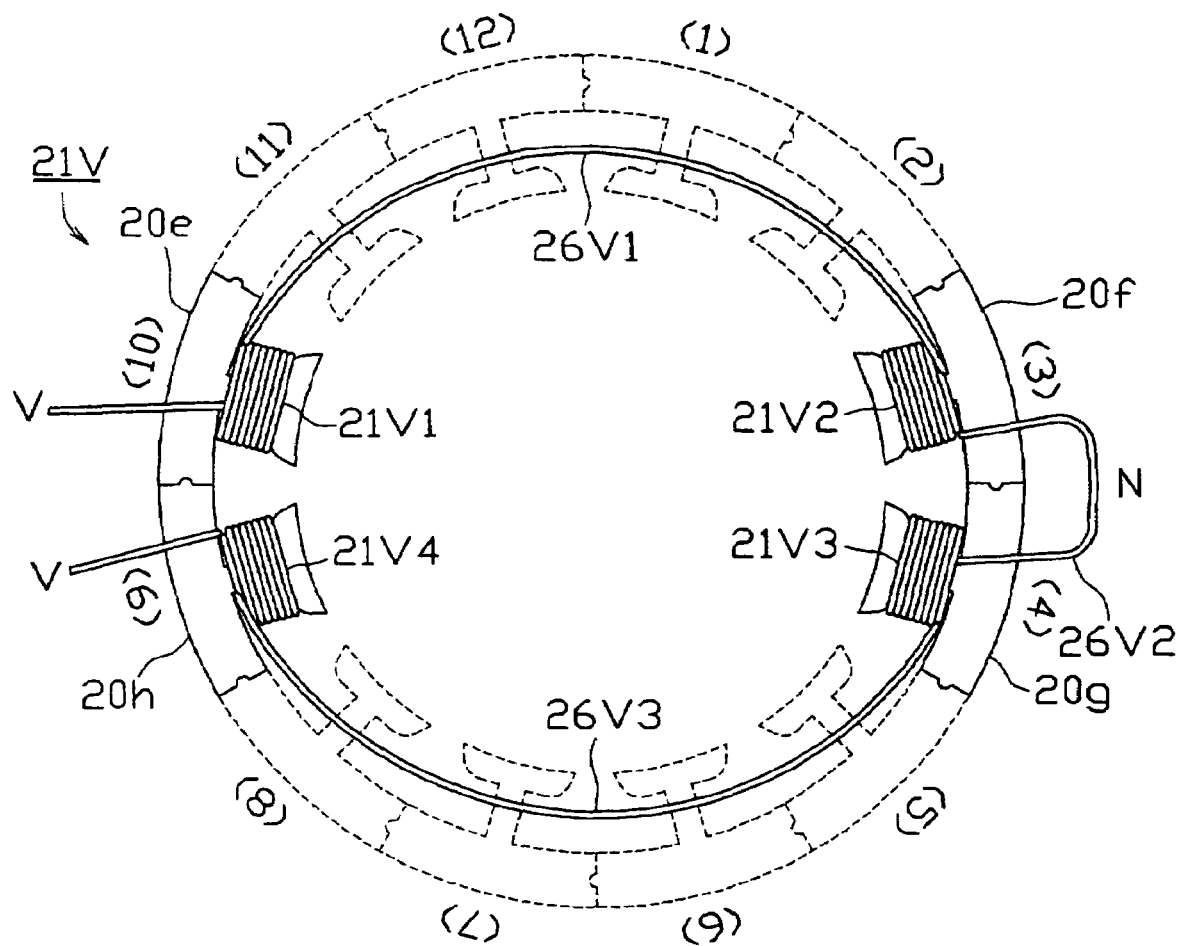
FIG. 7 is a schematic view showing an arrangement of a coil group 21V.

In the same manner, in the V-phase coil group 21V, the coils 21V1 and 21V2 and the coils 21V3 and 21V4 are formed as the different divided groups connected in parallel, among the respective coils 21V1, 21V2, 21V3 and 21V4, and are arranged such that the crossover 26V2 between the coil 21V2 and the coil 21V3 constituting the different divided groups becomes the neutral point N of the star wire connection. As shown in FIG. 7, the coil 21V1 is arranged at the position (10), the coil 21V2 is arranged at the position (3), the coil 21V3 is arranged at the position (4), the coil 21V4 is arranged at the position (9), the lead wires from the coils 21V1 and 21V4 are set as an input of the V phase, and the crossover 26V2 is set as the neutral point N.

Figure 8:
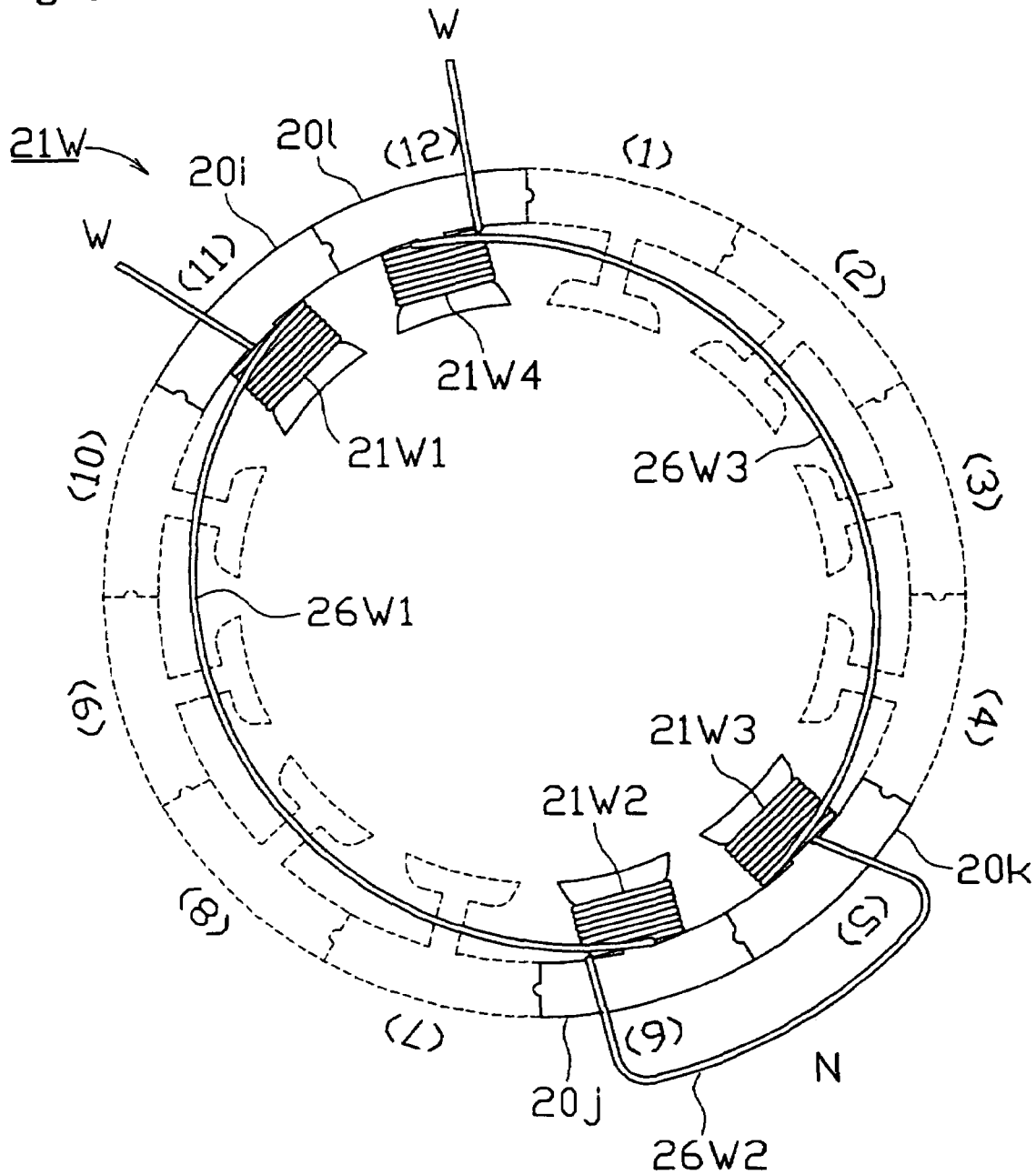
FIG. 8 is a schematic view showing an arrangement of a coil group 21W.

In the same manner, in the W-phase coil group 21W, the coils 21W1 and 21W2 and the coils 21W3 and 21W4 are formed as the different divided groups connected in parallel, among the respective coils 21W1, 21W2, 21W3 and 21W4, and are arranged such that the crossover 26W2 between the coil 21W2 and the coil 21W3 constituting the different divided groups becomes the neutral point N of the star wire connection. As shown in FIG. 8, the coil 21W1 is arranged at the position (11), the coil 21W2 is arranged at the position (6), the coil 21W3 is arranged at the position (5), the coil 21W4 is arranged at the position (12), the lead wires from the coils 21W1 and 21W4 are set as an input of the W phase, and the crossover 26W2 is set as the neutral point N.

Figure 9:
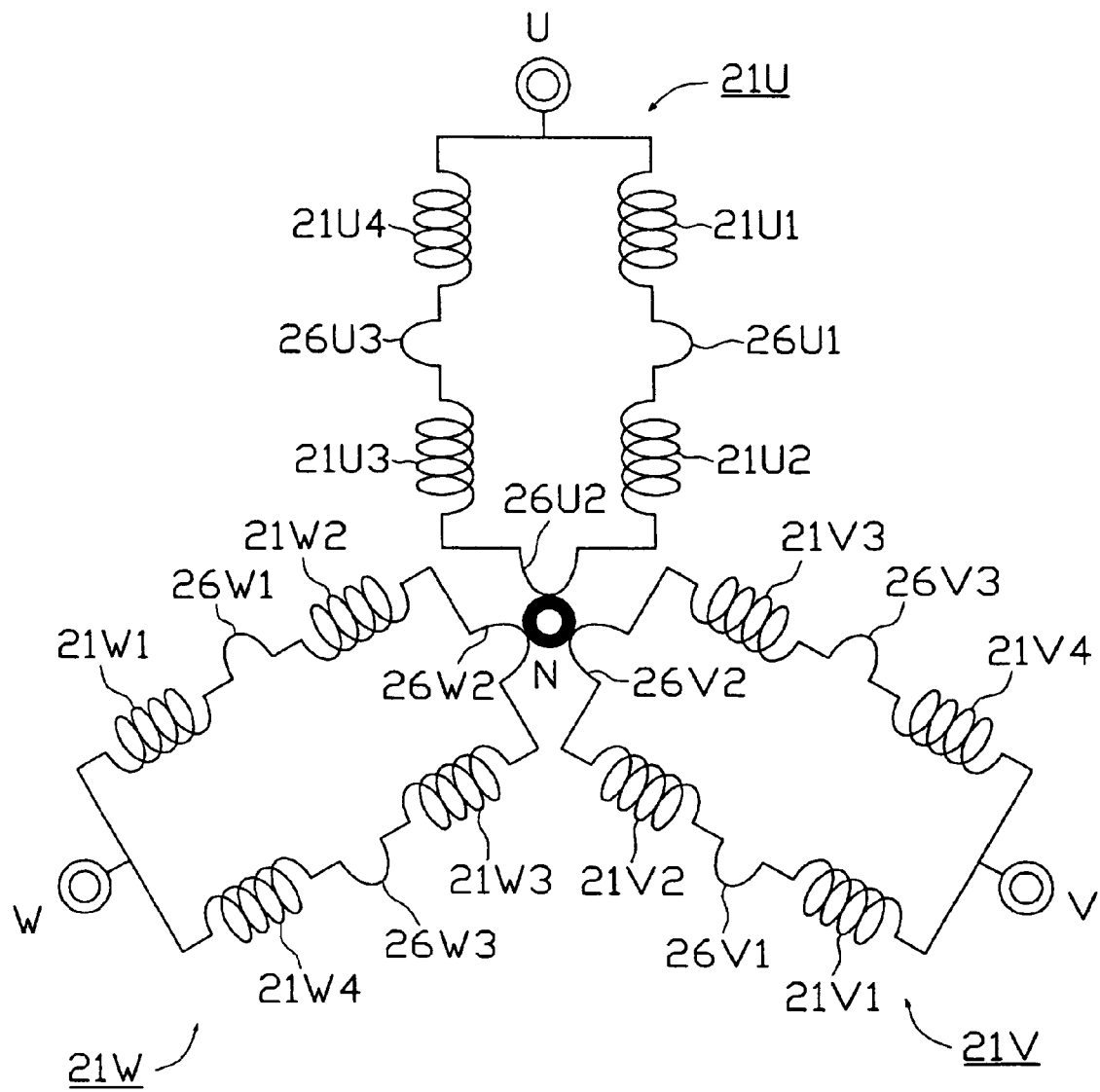
FIG. 9 is a schematic view showing a wire connection of each of coils in the brushless motor 100.

As described above, the respective coil groups 21U, 21V and 21W are arranged, the divided groups in the coil groups 21U, 21V and 21W of the same phase are connected in parallel as shown in FIG. 9, and the star wire connection is carried out such that the crossovers 26U2, 26V2 and 26W2 provided therebetween are set as the neutral point N. As described above, because the respective divided groups of the coil groups 21U, 21V and 21W are identical in the phase of the induction voltage, no circulating current is generated even if they are connected in parallel. Further, it is possible to make the divided groups to have the unlike poles by connecting such that the directions of the current of the respective divided groups are inverted by setting the crossovers 26U2, 26V2 and 26W2 provided between the respective divided groups as the neutral point N, even if the respective coil groups 21U, 21V and 21W are wound in the same winding direction.

Figure 10:
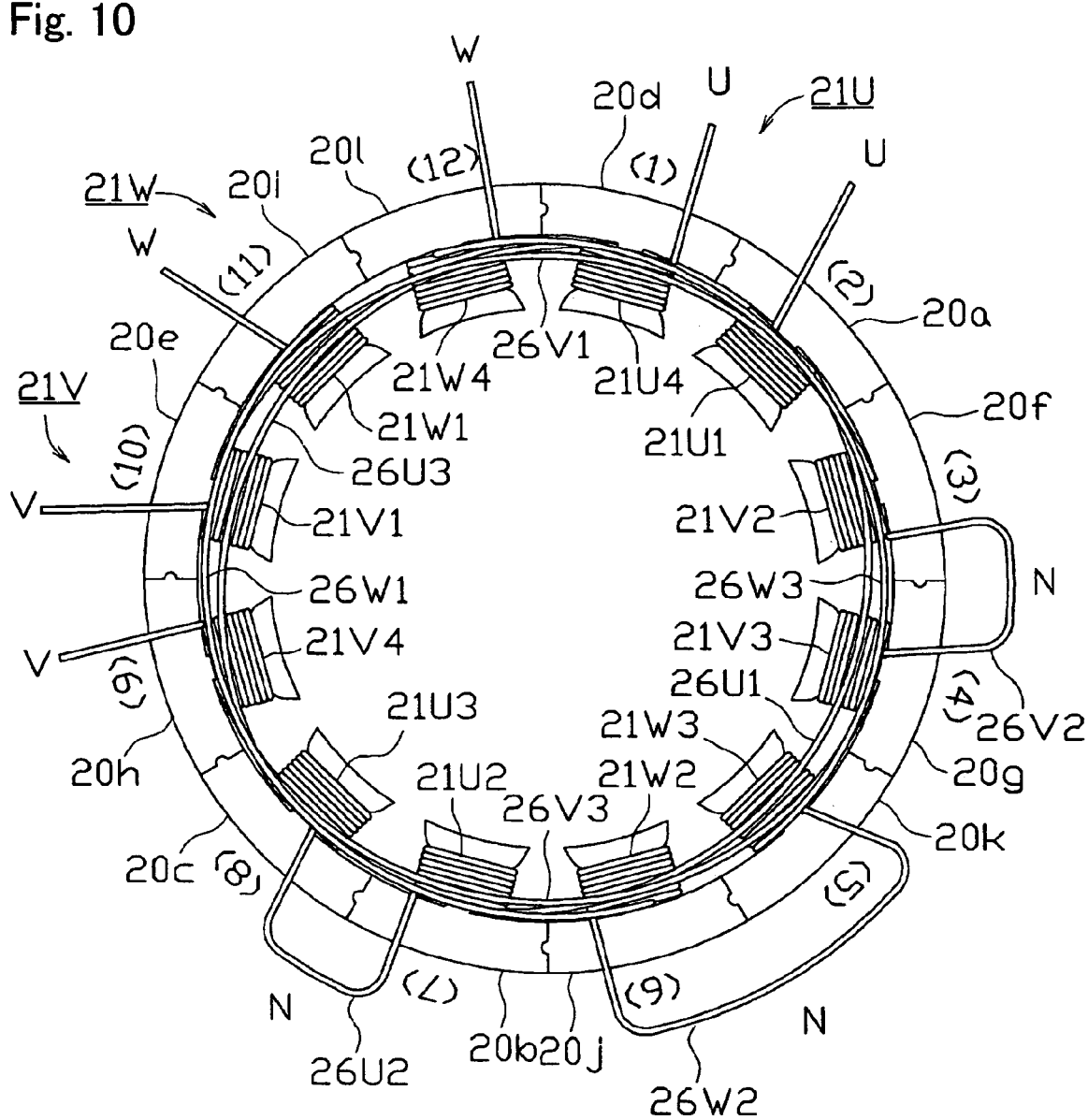
FIG. 10 is a plan view showing a configuration of a stator 102.
Figure 11:
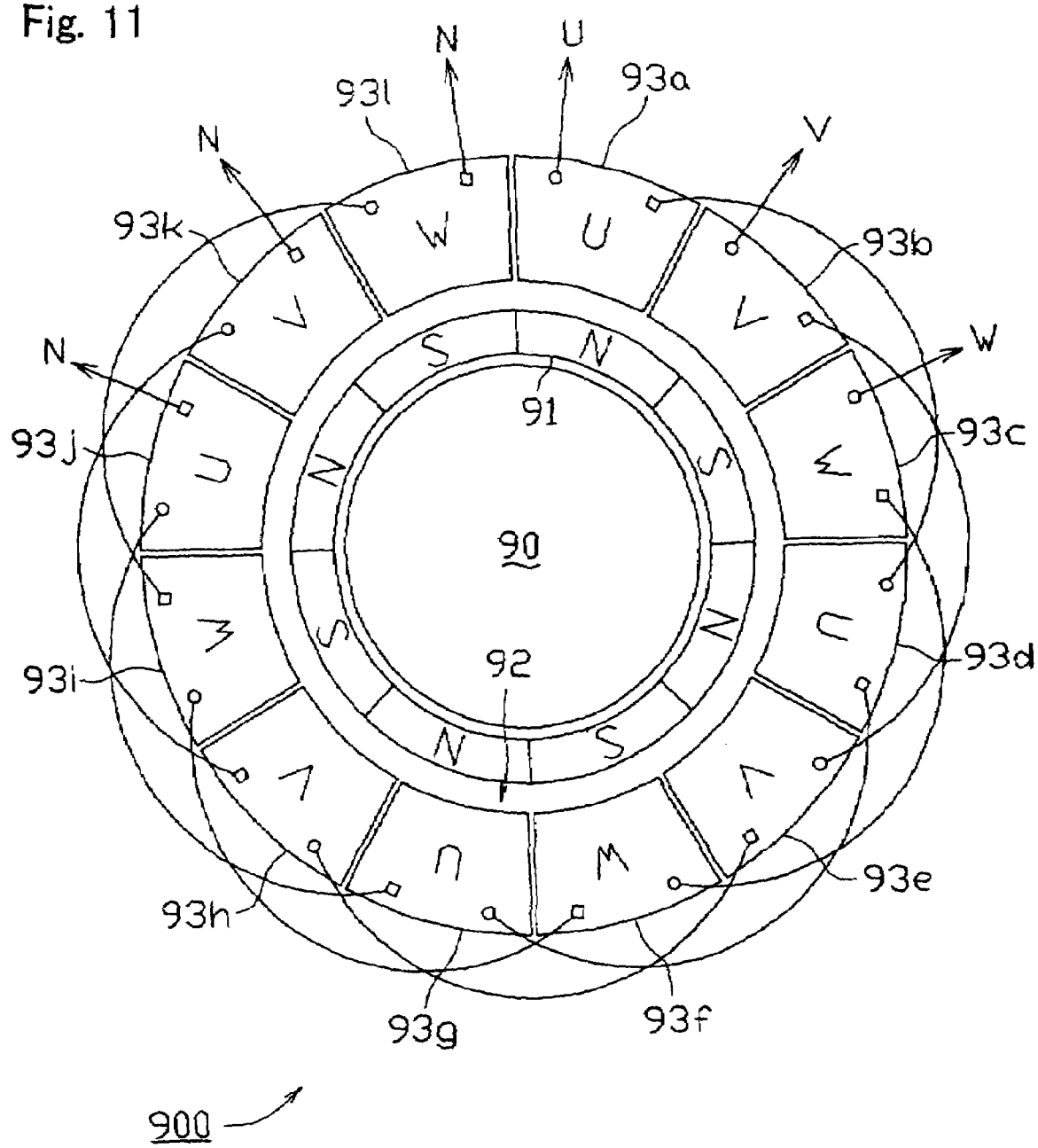
FIG. 11 is a schematic view showing arrangements of a U phase, a V phase and a W phase in a conventional brushless motor 900 having 8 poles and 12 slots.
Figure 12:
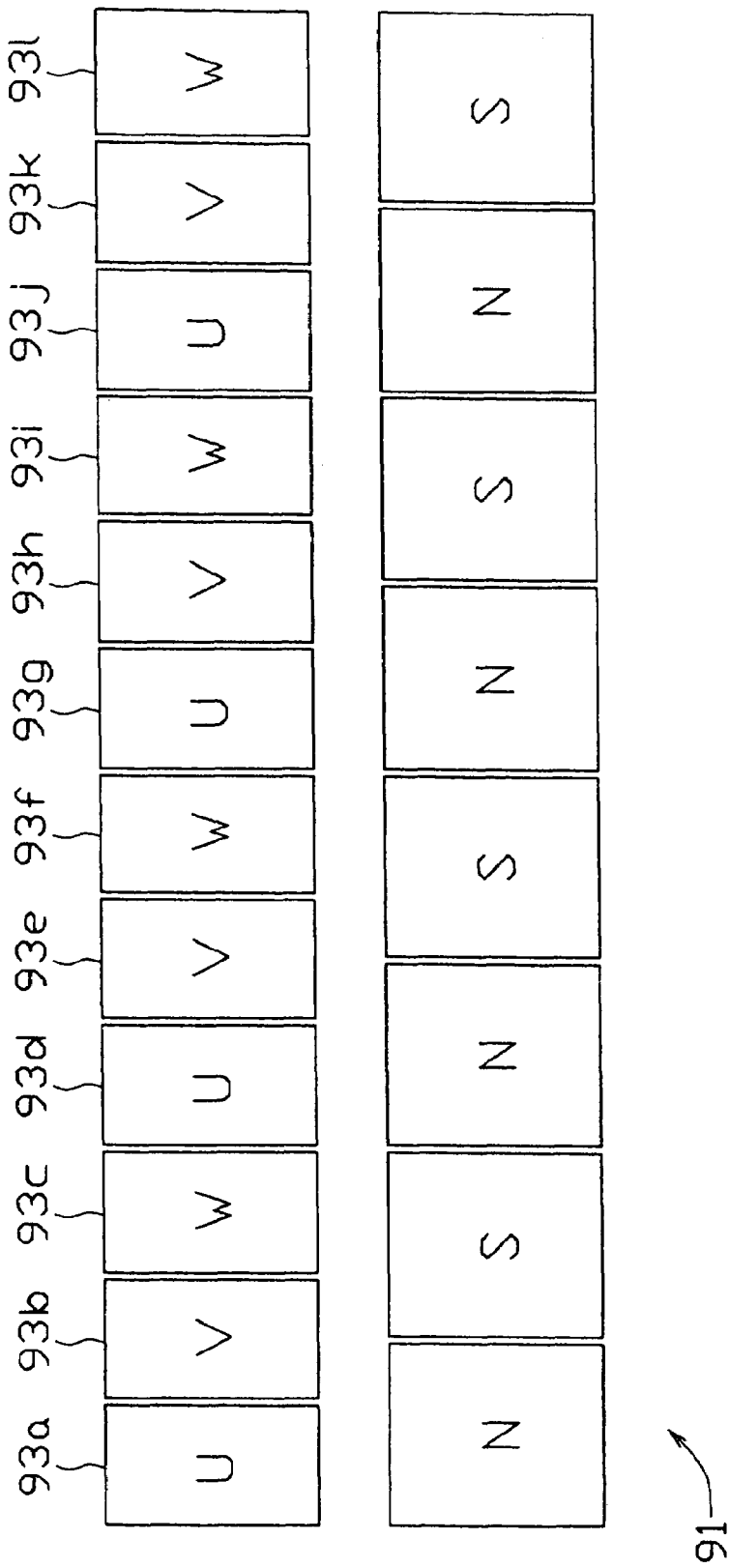
FIG. 12 is a schematic view showing phases of the U phase, the V phase and the W phase in the conventional brushless motor 900.
Figure 13:
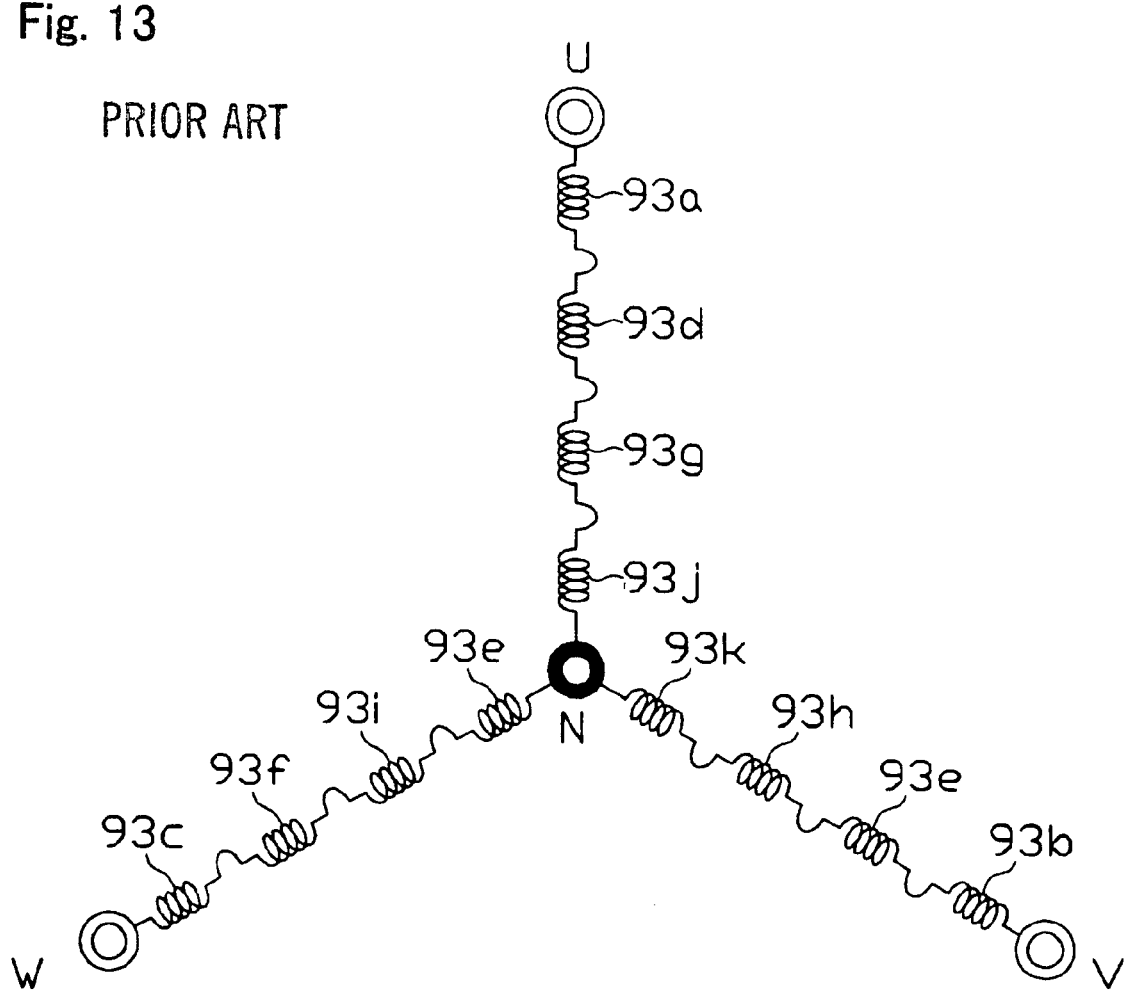
FIG. 13 is a schematic view showing a wire connection of each of coils in the conventional brushless motor 900.
Figure 14:
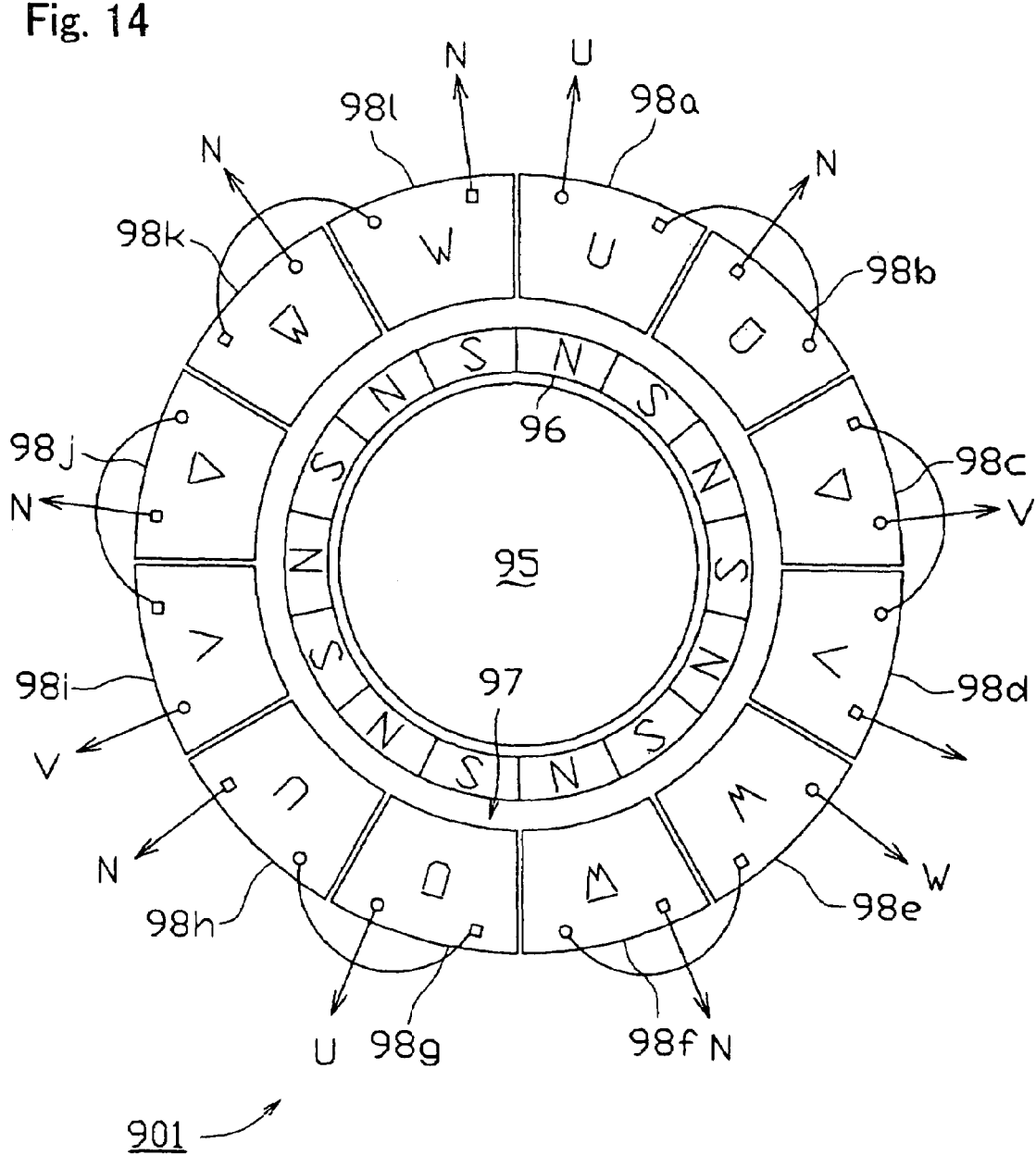
FIG. 14 is a schematic view showing arrangements of a U phase, a V phase and a W phase in a conventional brushless motor 901 having 14 poles and 12 slots.
Figure 15:
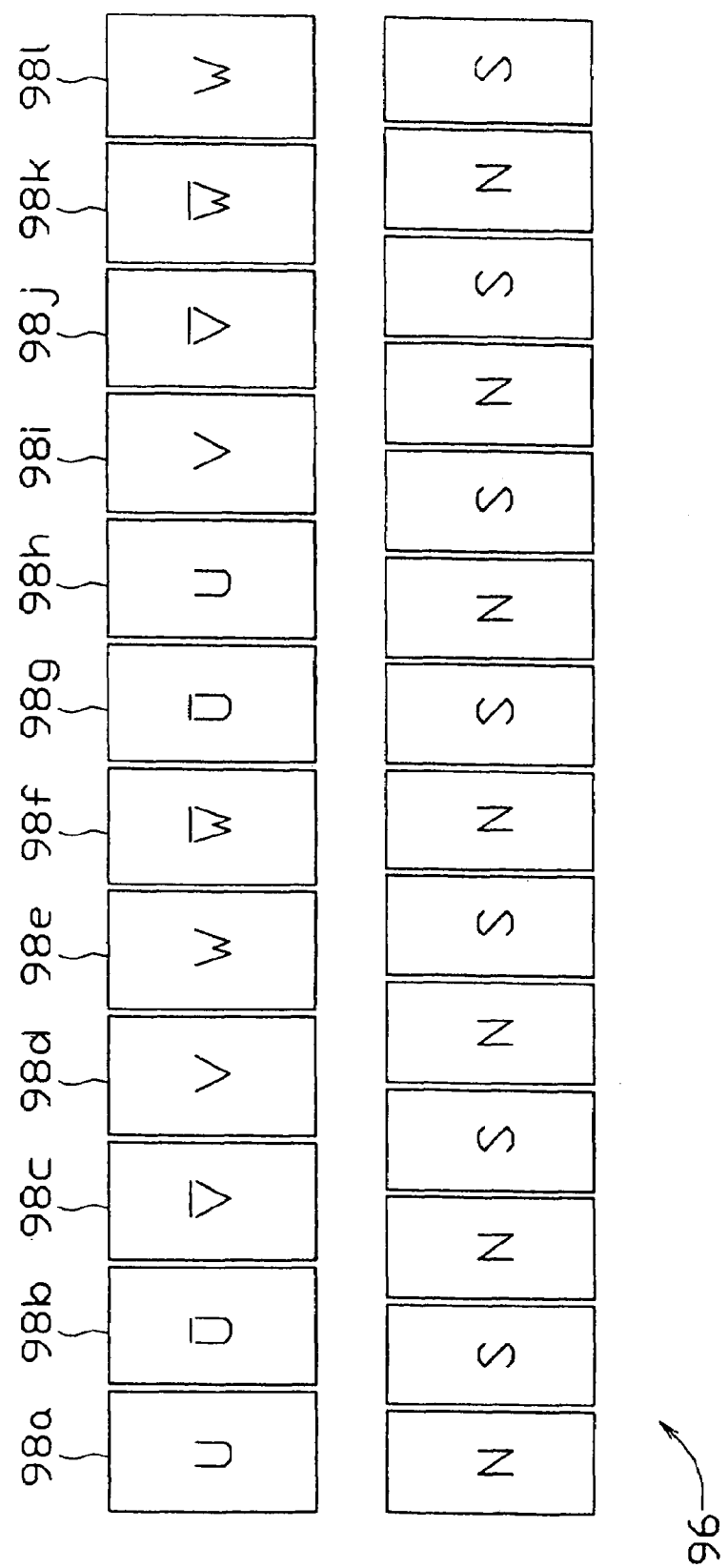
FIG. 15 is a schematic view showing phases of the U phase, the V phase and the W phase in the conventional brushless motor 901.
Figure 16:
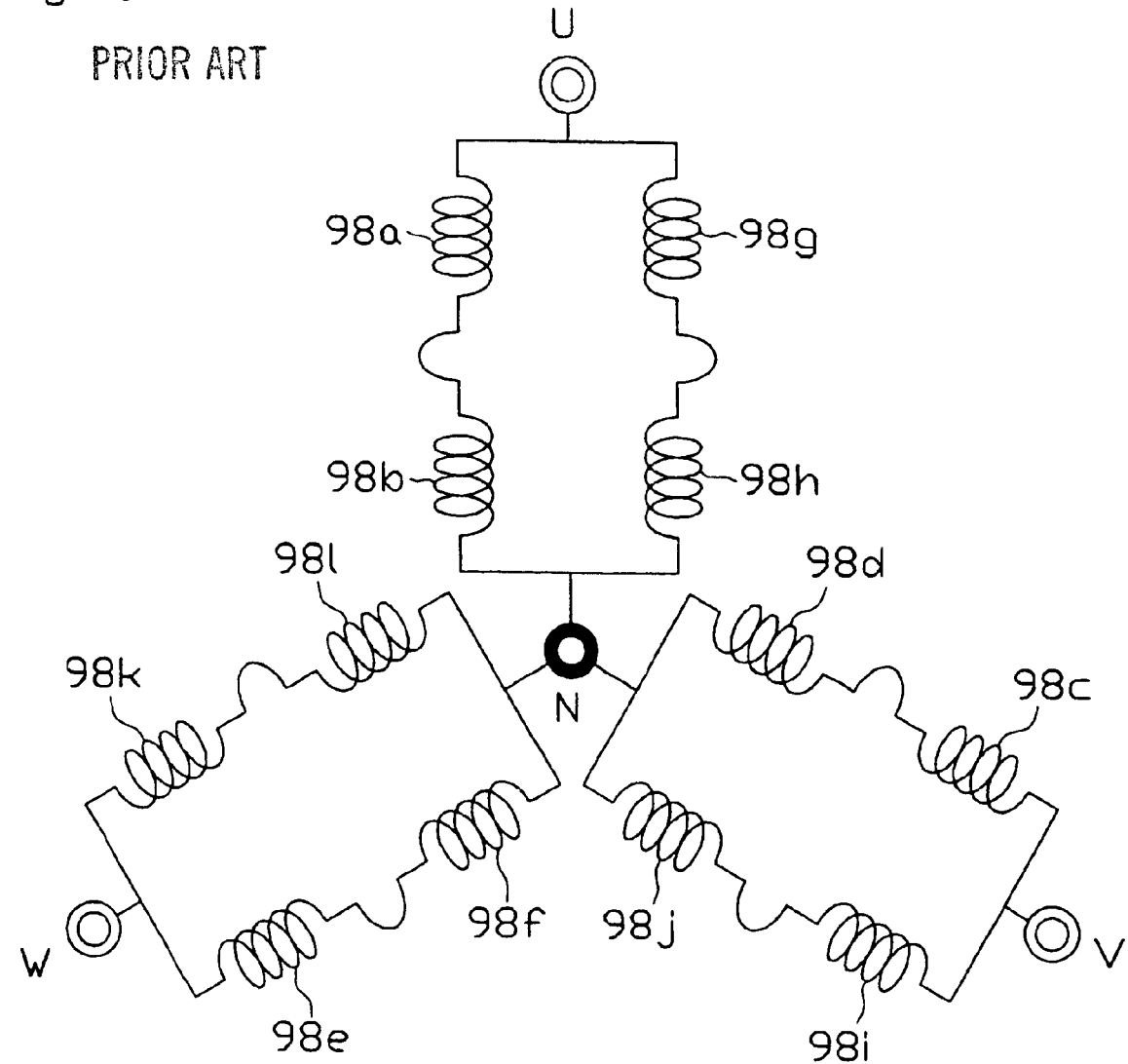
FIG. 16 is a schematic view showing a wire connection of each of coils in the conventional brushless motor 901.

Further, because the crossovers 26U2, 26V2 and 26W2 ferried between the adjacent coils in the respective coil groups 21U, 21V and 21W are set as the neutral point, it is not necessary to process as the so-called crossover, and it is sufficient to apply the wire connecting process by appropriately cutting or the like. Accordingly, even if the crossovers 26U2, 26V2 and 26W2 become thick by using the thick coil wire, the process is easily carried out. On the other hand, because the other crossovers 26U1, 26U3, 26V1, 26V3, 26W1 and 26W3 are formed between the coils arranged at the position interposing the coil groups having the different phases not between the adjacent coils, they are easily received annularly in the upper side of the stator 102, as shown in FIG. 10. Accordingly, a space saving can be achieved in the crossover portion of the stator 102, and a downsizing of the brushless motor 100 can be achieved. Further, it is possible to form and process the crossovers 26U1, 26U3, 26V1, 26V3, 26W1 and 26W3 without crossing, and a reliability of the brushless motor 100 is improved.

In this embodiment, the configuration is made such that four coils constituting each of the coil groups 21U, 21V and 21W are continuously wound in the same winding direction by setting the number of the neutral point of the start wire connection to one. However, the configuration may be made such that only the coils constituting the same divided group in each of the coil groups 21U, 21V and 21W are continuously wound in the same winding direction by setting the number of the neutral point N to two. For example, in the U-phase coil group 21U, the configuration may be made such that the coils 21U1 and 21U2 are continuously wound in the same winding direction, and the other coils 21U3 and 21U4 are continuously wound in the same winding direction. Further, it goes without saying that the winding direction of the continuous winding of each of the coil groups 21U, 21V and 21W is the counterclockwise direction or the clockwise direction. Further, in this embodiment, the stator 102 is configured by coupling the divided cores 20a to 20l divided per the teeth unit in the ring shape. However, the stator according to the invention is not limited to the divided cores 20a to 20l. For example, the invention can be carried out in the other known stator configuration capable of facilitating the continuous coil winding such as the configuration in which the stator 102 is formed by coupling the respective divided cores 20a to 20l so as to form a serial body and thereafter rounding in an annular body, the configuration in which the ring shaped stator 102 is formed by making the divided cores 20a to 20l as a linear shape integrally coupled in a thin connection portion and bending after the continuous coil winding, and the like.

Further, the effect of the invention is particularly significant in the case that the number of the coils constituting the coil group of the same phase is an even number equal to or more than four; however, the configuration of the brushless motor 100 according to this embodiment corresponds only to one example, and the stator and the brushless motor according to the invention are not limited to those having 14 poles and 12 slots. It goes without saying that the number of the motor poles and the number of the slots can be appropriately changed within the scope of the invention.

What is claimed is:

1. A stator in which a plurality of coils constituting a coil group of the same phase are respectively arranged so as to include offset positions at which phases of induction voltage are different, whereby coil groups of three phases are disposed in a ring shape,
wherein a pair of coils of the same phase of induction voltage are set in each of two divided groups in a plurality of coils constituting the coil group of the same phase, the respective coils in each divided group are continuously wound in the same winding direction with a crossover provided between the respective coils which are adjacent to each other, the two divided groups are connected to each other in parallel, and lead wires in coil groups of the three phases are star connected,
wherein the pair of coils in each of the two divided groups are not adjacent to each other.

2. The stator according to claim 1, wherein all of the respective coils in the coil group of the same phase are continuously wound in the same winding direction with a crossover provided between the respective coils, and a crossover between coils of the two divided groups is formed as a neutral point of the star wire connection.

3. The stator according to claim 2, wherein the coils constituting one of the two divided groups are arranged at a position in which at least one coil in the group of the different phase is interposed.

4. The status according to claim 2, wherein the number of the coils constituting the coil group of the same phase is an even number equal to or more than four.

5. A brushless motor including the stator according to claim 2.

6. A brushless motor including the stator according to claim 1.

7. The stator according to claim 1, wherein the number of the coils constituting the coil group of the same phase is an even number equal to or more than four.

8. A brushless motor including the stator according to claim 7.

9. The stator according to claim 1, wherein the coils constituting one of the two divided groups are arranged at a position in which at least one coil in the coil group of the different phase is interposed.

10. The status according to claim 9, wherein the number of the coils constituting the coil group of the same phase is an even number equal to or more than four.

11. A brushless motor including the stator according to claim 9.

* * * * *